United States Patent
Murakami et al.

(10) Patent No.: US 12,132,429 B2
(45) Date of Patent: Oct. 29, 2024

(54) POWER CONVERSION DEVICE AND MOTOR SYSTEM

(71) Applicant: Mitsubishi Electric Corporation, Tokyo (JP)

(72) Inventors: Satoshi Murakami, Tokyo (JP); Yoshihiro Takeshima, Tokyo (JP); Yoshiaki Ishiguro, Tokyo (JP); Akira Nakagawa, Tokyo (JP); Ryota Kondo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 80 days.

(21) Appl. No.: 17/783,000

(22) PCT Filed: Jan. 15, 2020

(86) PCT No.: PCT/JP2020/001089
§ 371 (c)(1),
(2) Date: Jun. 7, 2022

(87) PCT Pub. No.: WO2021/144885
PCT Pub. Date: Jul. 22, 2021

(65) Prior Publication Data
US 2023/0019205 A1    Jan. 19, 2023

(51) Int. Cl.
*H02P 27/06* (2006.01)
*H02M 1/00* (2007.01)
(Continued)

(52) U.S. Cl.
CPC .......... *H02P 27/06* (2013.01); *H02M 1/0048* (2021.05); *H02M 7/483* (2013.01); *H02M 7/537* (2013.01)

(58) Field of Classification Search
CPC ..... H02P 27/06; H02M 1/0048; H02M 7/483; H02M 7/537; H02M 7/5387
(Continued)

(56) References Cited

U.S. PATENT DOCUMENTS

| 8,223,515 B2 * | 7/2012 | Abolhassani | H02P 13/06 |
| | | | 363/39 |
| 8,750,005 B2 * | 6/2014 | Fujii | H02J 3/381 |
| | | | 363/132 |

(Continued)

FOREIGN PATENT DOCUMENTS

DE  10 2013 202 649 A1  8/2014
DE  10 2014 226 159 A1  6/2016
(Continued)

OTHER PUBLICATIONS

International Search Report and Written Opinion mailed on Apr. 21, 2020, received for PCT Application PCT/JP2020/001089, Filed on Jan. 15, 2020, 8 pages including English Translation.
(Continued)

*Primary Examiner* — David Luo
(74) *Attorney, Agent, or Firm* — XSENSUS LLP

(57) ABSTRACT

A power conversion device and a motor system according to the present disclosure comprises an inverter circuit which is connected to a motor, a switch circuit, and a control circuit. The power conversion device and the motor system are characterized in that the inverter circuit and the switch circuit are capable of two-level operation and three-level operation, and the control circuit switches between the two-level operation and the three-level operation on the basis of the motor torque command and the rotational speed command. As a result, it is possible to reduce the total loss in the power conversion device and the motor.

18 Claims, 6 Drawing Sheets

(51) Int. Cl.
*H02M 7/483* (2007.01)
*H02M 7/537* (2006.01)

(58) Field of Classification Search
USPC .................................. 318/504, 494
See application file for complete search history.

(56) References Cited

U.S. PATENT DOCUMENTS

| | | | |
|---|---|---|---|
| 9,270,222 B2* | 2/2016 | Yoo | H02M 7/49 |
| 10,075,094 B2* | 9/2018 | Sahhary | B60L 50/64 |
| 2013/0163301 A1 | 6/2013 | Fujii et al. | |

FOREIGN PATENT DOCUMENTS

| | | | |
|---|---|---|---|
| JP | 2017-093039 A | 5/2017 |
| WO | 2012/025978 A1 | 3/2012 |

OTHER PUBLICATIONS

Office Action issued Jul. 30, 2024 in German Patent Application No. 11 2020 006 514.6, 11 pages.
Tae-Hun Kim, et al., "Mode transition scheme for optimal efficient operation of a 3-level T-type inverter", 2017 IEEE, 3rd International Future Energy Electronics Conference and ECCE Asia, Year: 2017, Downloaded on Jun. 20, 2024, 6 pages.

* cited by examiner

FIG. 3
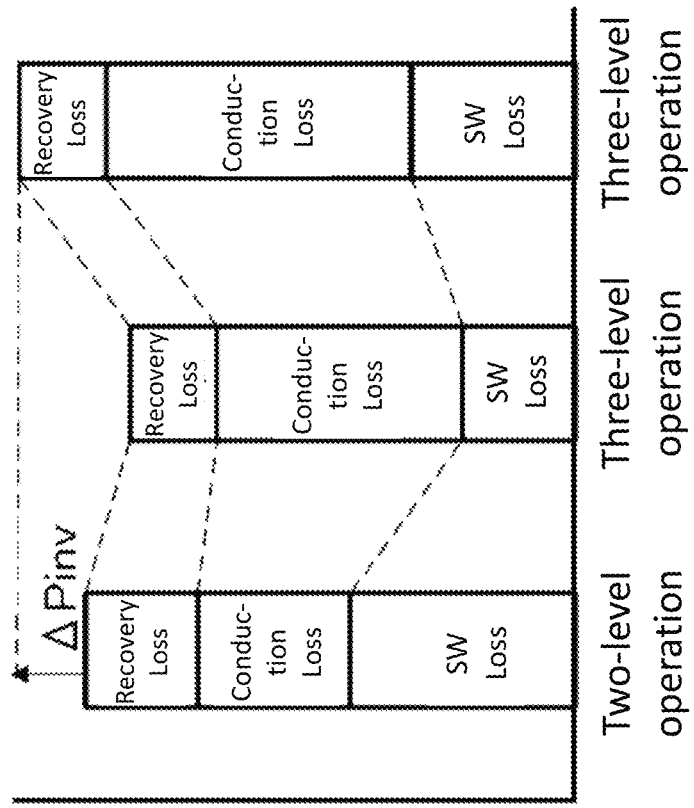
(b) Inverter loss
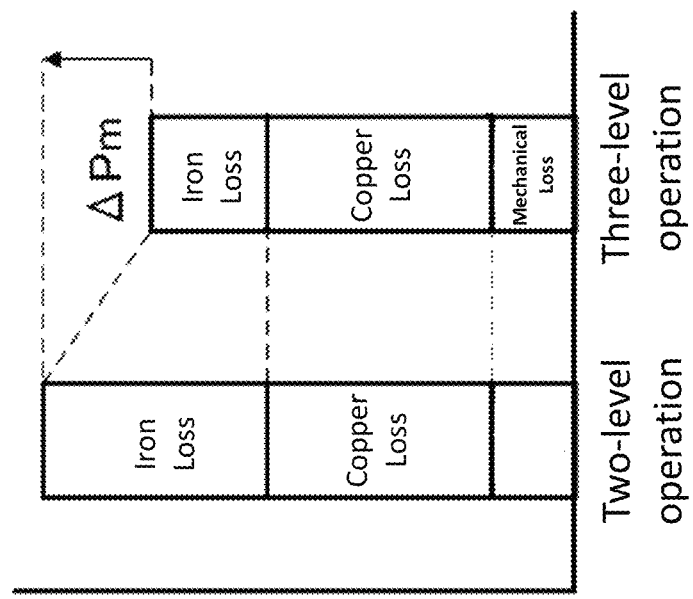
(a) Motor loss

POWER CONVERSION DEVICE AND MOTOR SYSTEM

CROSS-REFERENCE TO RELATED APPLICATION

The present application is based on PCT filing PCT/JP2020/001089, filed Jan. 15, 2020, the entire contents of which is incorporated herein by reference.

TECHNICAL FIELD

The present disclosure relates to a power conversion device for supplying power to a motor, and a motor system using the power conversion device.

BACKGROUND ART

Various types of inverter devices have been proposed for converting DC power into AC power and supplying the power to a motor. For example, there is a power conversion device that enables a power converter to be in three-level operation or two-level operation (for example, refer to Patent Document 1), in which, in order for an inverter device to reduce a loss in the inverter operation, at least two valve devices composed of semiconductor devices are connected in series to form one arm; at least three arms are connected in parallel; between a mutual connection point at the valve devices in each arm and a mutual connection point at the DC power sources, an AC switch in which at least two valve devices are connected in series each including a semiconductor device and a diode connected in antiparallel to the semiconductor device is connected; and each of the AC switches is turned on or off.

CITATION LIST

Patent Document

Patent Document 1; International Publication No. WO2012-025978

SUMMARY OF INVENTION

Problems to be Solved by Invention

In the power conversion device as disclosed in Patent Document 1, the level of operation of the inverter is switched to the two/three-level in order to reduce only the loss of the inverter device, but reduction of the total loss including that of the load (for example, a motor) connected to the inverter device is not considered. Therefore, even in the case where the loss of the inverter device is reduced, there is a problem in that the reduction of the loss as a whole system including the load such as the motor cannot be achieved.

It is therefore an object of the present disclosure to provide a power conversion device capable of reducing the total loss of the power conversion device and the motor, and a motor system using the power conversion device in order to solve the above-mentioned problem.

Means for Solving Problems

A power conversion device according to the present disclosure is provided with a capacitor series circuit including a plurality of capacitors connected in series, both ends of the capacitor series circuit being connected to both ends of a DC voltage source, an inverter circuit in which a plurality of legs each including a plurality of switching devices connected in series are connected in parallel, DC input terminals of the inverter circuit are connected to both ends of the capacitor series circuit, and AC output terminals of the inverter circuit are connected to a motor, a switch circuit including a plurality of switching devices, one end of the switch circuit being connected to a connection point of the plurality of capacitors, other ends of the switch circuit being connected to a plurality of connection points of the switching devices of the inverter circuit, and a control circuit to control the inverter circuit and the switch circuit, wherein the inverter circuit is capable of two-level operation by turning off the plurality of switching devices included in the switch circuit and is capable of three-level operation by turning on or off in the plurality of switching devices included in the switch circuit, and the control circuit switches between the two-level operation and the three-level operation based on a torque command and a rotational speed command for the motor.

Further, a motor system according to the present disclosure is provided with the power conversion device and the motor connected to the AC output terminals of the power conversion device, wherein the control circuit of the power conversion device switches between the two-level operation and the three-level operation based on the torque command and the rotational speed command for the motor.

Effect of Invention

According to the power conversion device and the motor system of the present disclosure, it is possible to reduce the total loss in the power conversion device and the motor.

BRIEF DESCRIPTION OF DRAWINGS

FIG. 3 is a diagram for explaining a relationship of losses in a motor and a relationship of losses in an inverter according to the Embodiment 1.

MODES FOR CARRYING OUT INVENTION

Embodiment 1

Figure 1:
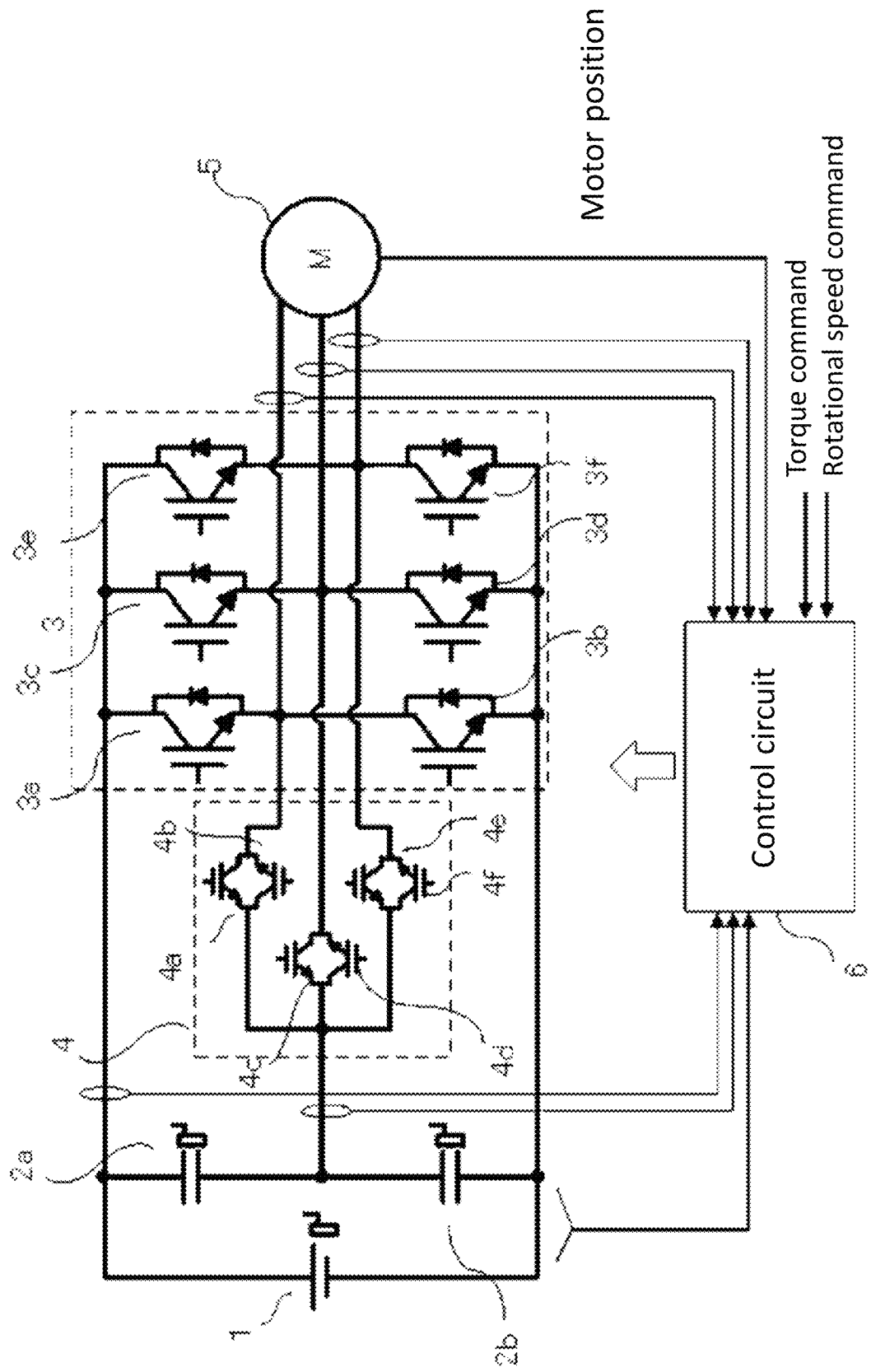
FIG. 1 is a configuration diagram of a motor system according to Embodiment 1.

A power conversion device and a motor system according to Embodiment 1 of the present disclosure will be described referring to the drawings. FIG. 1 is a configuration diagram showing the power conversion device according to the Embodiment 1 and the motor system using the power conversion device. In the motor system shown in FIG. 1, the power conversion device is connected to a DC voltage source 1 and a motor 5 and operates the motor by converting DC power from the DC voltage source 1 into AC power and outputting the AC power to the motor 5. The power conversion device is a three-phase inverter device including two capacitors (capacitors 2a, 2b) connected in series, an inverter circuit 3, a switch circuit 4, and a control circuit 6. Note that the three-phase inverter device is shown in the present embodiment, but it does not have to be of three-phases, and it may be of a single phase or more than three phases.

The capacitors 2a, 2b are connected in series with each other to form a capacitor series circuit 2. Here, a connection point between the capacitor 2a and the capacitor 2b will be described as a first connection point. Both ends of the capacitor series circuit 2 are connected to both ends of the DC voltage source 1 and DC input terminals of the inverter circuit 3 to be described later. Note that, although the capacitor series circuit 2 is shown here in a case where two capacitors are connected in series, it is not limited to the case, and three or more capacitors may be connected.

The inverter circuit 3 has a configuration in which three legs each of which is composed of two switching devices connected in series are connected in parallel, and both ends of each leg are connected to both ends of the capacitor series circuit 2 and both ends of the DC voltage source 1. In the example shown in FIG. 1, switching devices 3a and 3b are connected in series with each other, the same with switching devices 3c and 3d, and switching devices 3e and 3f. Here, respective connection points of the switching devices will be described as a second connection point to fourth connection point. The second to fourth connection points serve as AC output terminals of the inverter circuit 3. The motor 5 is connected to the second to fourth connection points, and the inverter circuit 3 supplies converted AC power into the motor 5 via the second to fourth connection points.

The switch circuit 4 includes a plurality of switching devices, and switching between two-level operation and three-level operation described later can be performed by controlling these switching devices. The switch circuit 4 shown in FIG. 1 is provided between the second to fourth connection points of the inverter circuit 3 and the first connection point of the capacitors 2a, 2b and has a structure in which semiconductor devices of the reverse block type such as Insulated Gate Bipolar Transistors (IGBT) are connected face to face. The switch circuit 4 has switching devices of the IGBT, 4a to 4f, and those connected in antiparallel with each other are the switching devices 4a and 4b, the switching devices 4c and 4d, and the switching devices 4e and 4f. One end of the switch circuit 4 is connected to the first connection point of the capacitor series circuit 2, and the other ends thereof are connected to respective connection points of the second to the fourth.

With this configuration, when the switching device 4a is turned on, a current can flow from the second connection point to the first connection point, and when the switching device 4b is turned on, a current can flow from the first connection point to the second connection point. Similarly, by turning on the switching devices 4c or 4e, a current can flow from the third or the fourth connection point to the first connection point, and by turning on the switching devices 4d or 4f, a current can flow from the first connection point to the third or the fourth connection point. Note that the switch circuit 4 is not limited to the configuration shown in FIG. 1, as long as the direction in which the current flows can be controlled by turning one of the switching devices on or off.

The motor 5 is connected to the AC output terminals of the inverter circuit 3 and operates by the AC power output from the inverter circuit 3. The motor 5 may be of any type, and a torque command and a rotational speed command are calculated by a control device not shown in FIG. 1, and the control circuit 6 controls each switching device of the power conversion device on the basis of the torque command and the rotational speed command to control the motor 5. The control device for generating the torque command and the rotational speed command may also be served by the control circuit 6.

The control circuit 6 controls the inverter circuit 3 and the switch circuit 4. That is, the AC power output to the motor 5 is controlled on the basis of inverter operating state information, motor operating state information, and command value information. For example, a voltage of the DC voltage source 1, voltages and flowing current of the capacitors 2a, 2b, and temperatures of the inverter circuit 3 and the switch circuit 4 are taken in, information on phase currents and a rotational position from the motor and information on the torque command and the rotational speed command (NT characteristics) are taken in, and the control of the inverter circuit 3 and the switch circuit 4 is performed on the basis of the information described above. Further, the control circuit 6 holds an operation map in advance and determines and sets a driving method of the inverter circuit and the switch circuit so that the total loss of the power conversion device and the motor is minimized, the operation map including a carrier frequency of the inverter circuit and information on whether the two-level operation or the three-level operation which make the loss minimize in accordance with the operating states of the inverter and the motor are defined on the NT characteristics of the motor. Details will be described later.

Figure 2:
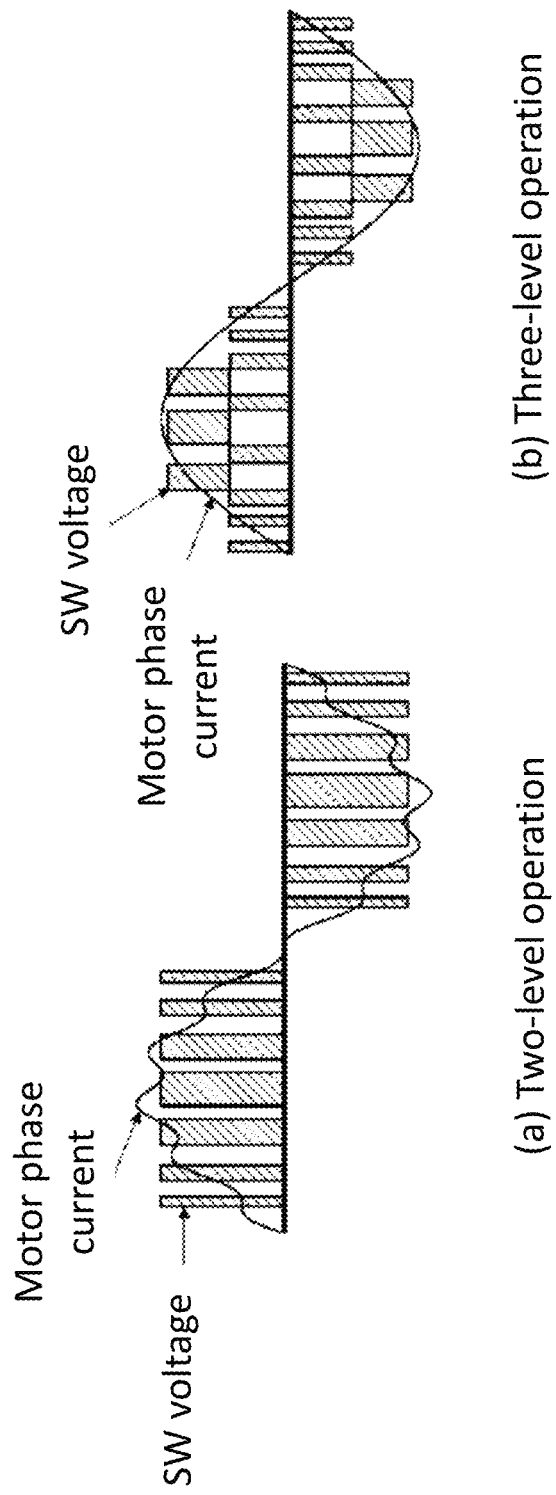
FIG. 2 is a diagram for explaining a motor harmonic iron loss according to Embodiment 1.

The two-level operation and the three-level operation will now be described. FIG. 2 shows schematic diagrams of motor currents when the inverter circuit 3 is in the two-level operation and when the inverter circuit 3 is in the three-level operation. First, the two-level operation will be described. In the two-level operation of the power conversion device according to the present embodiment, each of the switching devices of the switch circuit 4 is turned off and the switching devices of the inverter circuit 3 are turned on and off, so that a positive or a negative voltage of the total voltage of the capacitors 2a, 2b can be output to the motor 5 in each phase. By controlling time durations of the positive or negative voltages, three-phase sinusoidal voltages can be applied to the motor 5. The two-level operation is the operation of a typical three-phase inverter device, and a detailed description thereof will be omitted.

The three-level operation will be described. Here, the operation for one phase will be described, and the description for the other two phases will be omitted because the operation is similar thereto. First, a state in which a current flows from the inverter circuit 3 to the motor 5 will be described as an example. The description begins with a state in which the switching devices 3a and 3b and the switching devices 4a and 4b are in the off state, and the current flows through the diode connected to the switching device 3b in anti-parallel and returns to the motor 5. From this state, the switching device 4b is turned on and the switching devices 3a, 3b and the switching device 4a are kept turned off, so that a current flows into the motor 5 with the voltage of the capacitor 2b.

Next, when the switching device 3a is turned on while the switching device 4b is kept turned on (the switching device 3b and the switching device 4a are kept off), since the switching device 4b blocks the reverse current, no current flows through the switching device 4b, and the current flowing into the motor 5 increases due to the voltage of the capacitors 2a, 2b that are connected in series. On the other hand, when the current to the motor 5 is to be decreased, the operation is performed in the reverse order of the above. That is, the switching devices 3a, 3b and the switching device 4a are turned off while the switching device 4b is kept on, so that the current is supplied to the motor 5 due to the voltage of the capacitor 2b to reduce the current. Then finally operation in which all the switches are turned off is performed. When the inverter circuit 3 and the switch circuit 4 operate in this manner, the voltage change of each switching device becomes half of the voltage of the capacitors in series, that is, half of the power supply voltage, thereby reducing the switching loss and reducing the current distortion because the voltage for controlling the current is small.

A case where a current flows from the motor 5 to the inverter circuit 3 will be described. First, when the switching device 4a is turned on, the switching device 3b is turned on, and the switching device 4b is turned off, since the switching device 4a blocks the reverse current, no current flows from the capacitor 2b, and the current from the motor 5 flows into the switching device 3b and flows back to the motor 5. Next, when the switching device 3b is turned off (with the switching devices 3a and 4b remaining off), the current from the motor 5 flows through the switching device 4a to the capacitor 2b. Next, when the switching device 4a is turned off, the current from the motor 5 flows through the diode connected in anti-parallel with the switching device 3a to the capacitors 2a, 2b. Thereafter, the switching operation is performed in the reverse order to reduce the current from the motor 5. Although the operation of one phase has been described as an example, the operations in the other phases are the same as that of the one phase except for their phases.

Comparing current waveforms of motor phase currents in the two-level operation and the three-level operation shown in FIG. 2, the current waveform in the two-level operation is distorted as compared with the current waveform in the three-level operation. This is because, in the two-level operation, the voltage for generating the current is twice to control the current as compared with the three-level operation. In the two-level operation, the current distortion is large, so that a harmonic iron loss of the motor is large. Further, regarding this tendency, when the rotational speed of the motor increases, the number of switching times within one cycle of the phase current decreases, resulting in larger distortion and an increase in the harmonic iron loss.

FIG. 3 (a) shows a breakdown of the motor loss and FIG. 3 (b) shows a breakdown of the inverter loss, in the cases of the two-level operation and the three-level operation. Note that, here, the inverter loss refers to a total value of the losses in the power conversion device in each of the two-level operation and the three-level operation. In the motor loss shown in FIG. 3 (a) and in the 3-level operation, a mechanical loss and a copper loss of the motor are almost the same as those in the two-level operation, but the motor loss decreases because the harmonic iron loss decreases. Here, the amount of reduction in the motor loss in the three-level operation compared with that of the two-level operation is defined to be ΔPm. In contrast, regarding the inverter loss shown in FIG. 3(b), depending on the characteristics of the devices constituting the switch circuit 4 that do not allow the current to pass through during the two-level operation and operate only during the three-level operation, the loss may increase in the three-level operation rather than in the two-level operation, depending on the operation state of the inverter circuit 3. Here, the amount of increase in the inverter loss in the two-level operation compared with that of the three-level operation is defined to be ΔPinv. In order to minimize the loss of the motor system, ΔPm>ΔPinv needs to be satisfied, and the control circuit 6 switches between the two-level operation and the three-level operation so as to satisfy this condition.

Figure 4:
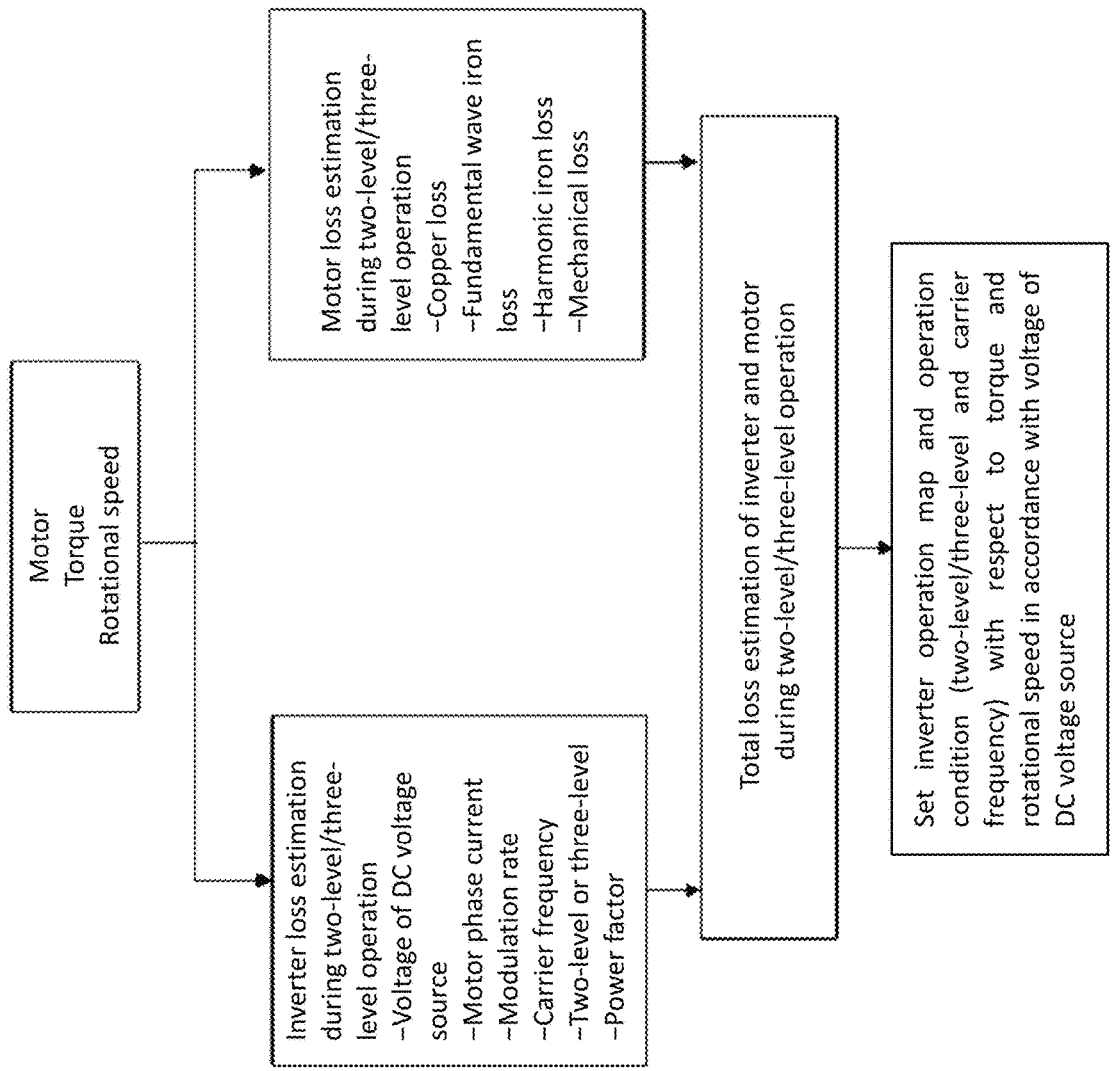
FIG. 4 is a schematic diagram showing a procedure for determining an operation map of an inverter according to the Embodiment 1.

FIG. 4 schematically illustrates a procedure for determining an operational map of the power conversion device so as to minimize the loss of the motor system, that is, the total loss of the power conversion device loss and the motor loss. In the motor system according to the present embodiment, torque and rotational speed that are necessary are calculated from the motor position and the amount of power supplied to the motor to create the torque command and the rotational speed command. From the torque command and the rotational speed command that are generated, the losses of the power conversion device and the motor in each of the two-level operation and the three-level operation are calculated. A calculation method to be used for the losses may be freely selected. For example, mathematical formulas for calculating the losses of the inverter circuit and the motor during the two-level operation and the three-level operation from the torque command or the rotational speed command may be stored, or an operation table prepared in advance on the basis of measured data or the like may be held. When the inverter loss is estimated, the motor phase current, a modulation rate of the inverter circuit 3, the carrier frequency, and a power factor are calculated from the motor torque command and the rotational speed command, and the inverter loss during the two-level operation and the three-level operation can be calculated from these values and a detected voltage of the DC voltage source. In addition, as for the motor loss, the copper loss, a fundamental wave iron loss, the harmonic iron loss, and the mechanical loss of the motor can be calculated from the torque command and the rotational speed of the motor, and the motor loss can be calculated from the sum of these.

On the basis of the calculated total loss from the losses of the inverter circuit and the motor during the two-level operation and the three-level operation, the control circuit 6 selects the one having a smaller total loss from among the two-level operation and the three-level operation and switches the operation condition.

In the above description, an example is shown in which the control circuit 6 switches between the two-level operation and the three-level operation so as to minimize the total loss of the power conversion device and the motor, but in addition to switching between the two-level operation and the three-level operation, the control may be performed to change the carrier frequency for controlling the operation of the inverter circuit. Since the current distortion is improved in the three-level operation as described above, the motor iron loss decreases. When the carrier frequency is lowered, the motor iron loss increases because the current distortion increases. However, the loss of the power conversion device decreases. Thus, the total loss can be lowered depending on the conditions. Therefore, when the rotational speed command is the same, the carrier frequency in the three-level operation is set to be equal to or lower than that in the two-level operation. That is, when the carrier frequency in the two-level operation is defined to be fx_2lv and the carrier frequency in the three-level operation is defined to be fx_3lv, the carrier frequency is set so as to satisfy fx_2lv≥fx_3lv.

Figure 5:
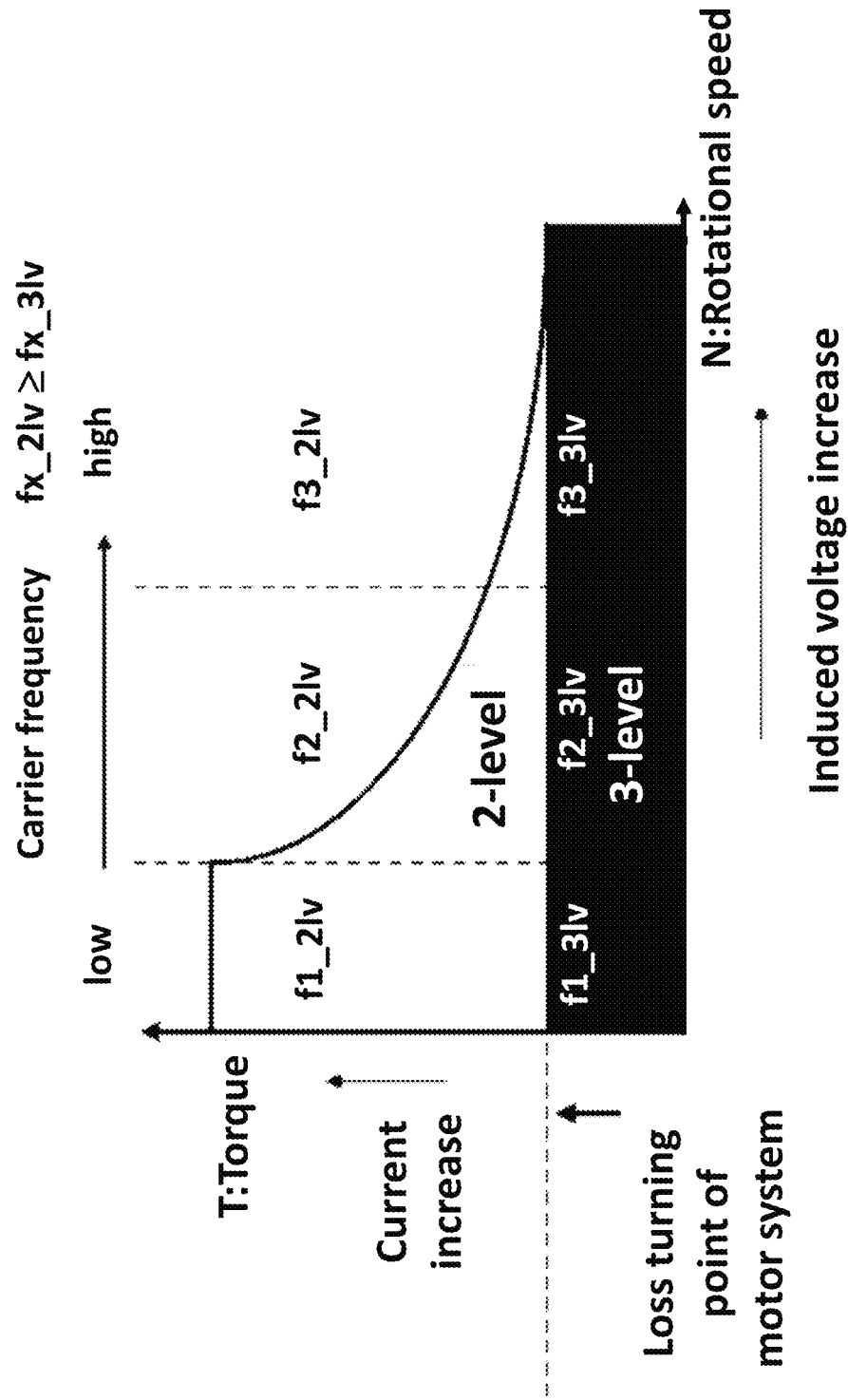
FIG. 5 is a schematic diagram showing the operation map of the inverter according to the Embodiment 1 which is mapped on a rotational speed-torque characteristic of a motor.

FIG. 5 shows the rotational speed and torque characteristics of the motor on which the operation in the two-level and the three-level of the inverter and carrier frequencies thereof are schematically mapped. As shown in FIG. 5, when the rotational speed command of the motor is the same, the control circuit 6 switches the operation to the two-level operation when the torque command is equal to or larger than a predetermined threshold value and switches the operation to the three-level operation when the torque command is smaller than the predetermined threshold value. The predetermined threshold value is a loss turning point of the motor system. Although the example shown in FIG. 5 has only one threshold value, hysteresis control may be performed by providing a plurality of threshold values so as to stabilize the operation. For example, the threshold value for switching between the two-level operation and the three-level operation in accordance with the torque command may be set to be different for cases where the torque command increases and decreases. Further, by setting the threshold value for the case of the increase higher than the threshold value for the case of the decrease, unnecessary switching between the two-level operation and the three-level operation can be prevented, and the operation can be stabilized.

In the operation map shown in FIG. 5, the carrier frequency is also changed in accordance with the rotational speed command of the motor. Regarding the setting of the carrier frequency, since the current distortion of the motor is small in the three-level operation, the harmonic iron loss is smaller than in the two-level operation. Further, the switching loss of the inverter is proportional to the switching frequency, and thus operation with the inverter loss lowered is possible when the frequency is lowered, although a trade-off relation with the harmonic iron loss of the motor exists. In this way, the carrier frequency is a conflicting parameter for the inverter and the motor, and it is necessary to set the carrier frequency so as to minimize the total loss of the inverter and the motor while the controllability is secured. Typically, in a region where the rotational speed is high, the loss in the motor system is dominated by the harmonic iron loss of the motor, and thus the carrier frequency may be set to be increased as the rotational speed is increased. Therefore, in the example shown in FIG. 5, the carrier frequency is to be changed into three stages in accordance with the rotational speed, the three stages having a relation: f1_3lv<f2_3lv<f3_3lv.

Note that, in addition to the torque command and the rotational speed command, other parameters may be used to calculate the losses of the inverter circuit and the motor during the two-level operation and the three-level operation. For example, the parameters can be a voltage of the DC voltage source and a temperature of the power conversion device in addition to the torque command and the rotational speed command. By holding an operation table in accordance with at least one parameter among the voltage of the DC voltage source and the temperature of the power conversion device may be held, the losses of the power conversion device and the motor may be calculated on the basis of this operation table.

Figure 6:
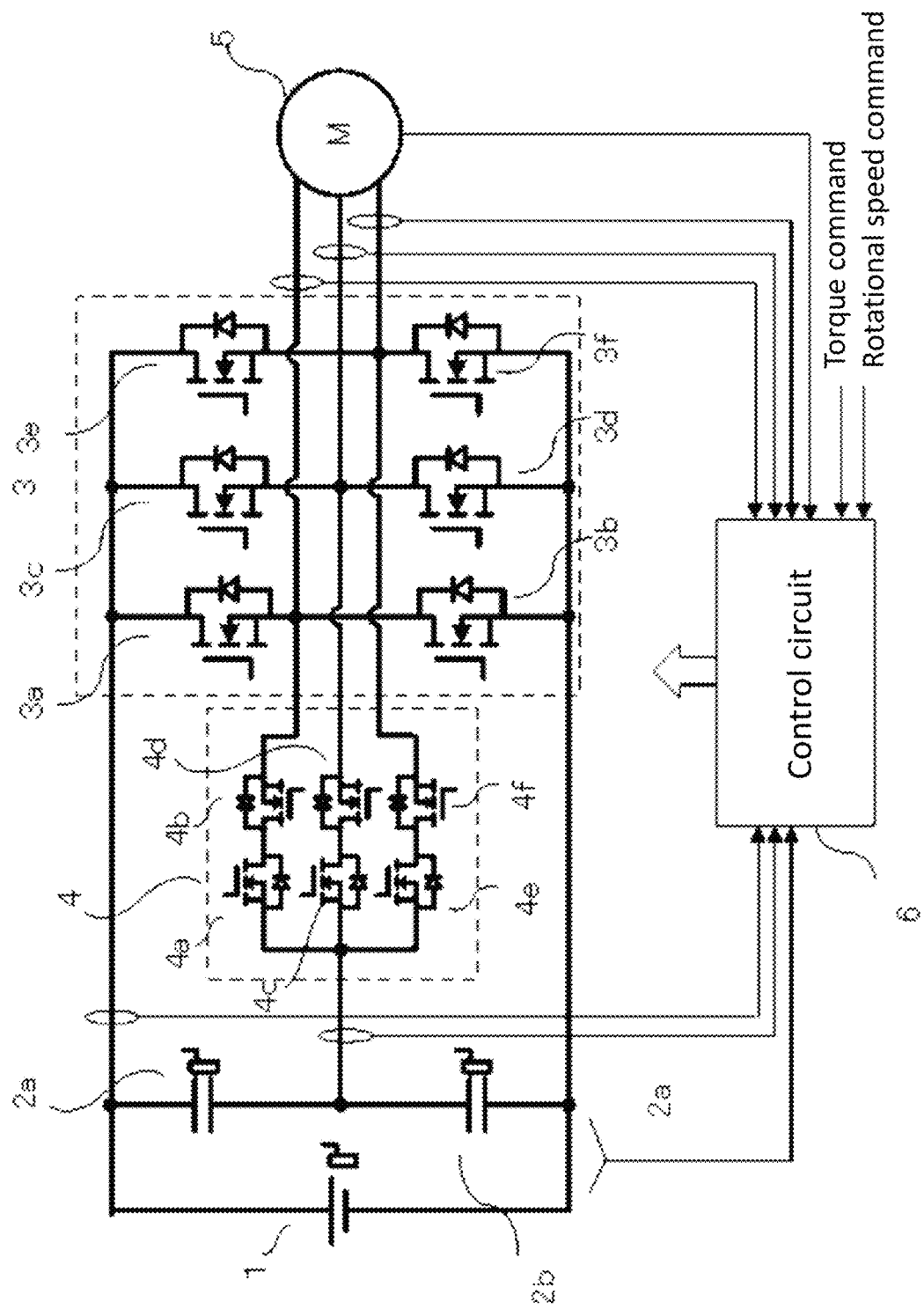
FIG. 6 is a configuration diagram of the motor system according to Embodiment 1.

In the power conversion device described above, the switch circuit 4 provided for performing the three-level operation is configured with the IGBTs of a reverse block type, but the inverter circuit 3 and the switch circuit 4 shown in FIG. 6 are constituted by Metal Oxide Semiconductors (MOS). In the power conversion device shown in FIG. 6, the switch circuit 4 includes the MOS switching devices 4a to 4f. The switch circuit 4 includes the switching devices of the MOS, 4a to 4f, and the switching device 4a and the switching device 4b are connected in series in the opposite directions, and the same with the switching device 4c and the switching device 4d, and the switching device 4e and the switching device 4f. One end of the switch circuit 4 is connected to the first connection point of the capacitor series circuit 2, and the other ends thereof are connected to respective connection points of the second to the fourth. The power conversion device configured in this manner and the motor system using the power conversion device can also exhibit the same effects as those of the motor system described above.

DESCRIPTION OF REFERENCE NUMERALS AND SIGNS

1: DC voltage source, 2: capacitor series circuit, 2a, 2b: capacitors, 3: inverter circuit, 3a to 3f: switching devices, 4: switch circuit, 4a to 4f switching devices, 5: motor, 6: control circuit

The invention claimed is:

1. A power conversion device comprising:
a capacitor series circuit including a plurality of capacitors connected in series, both ends of the capacitor series circuit being connected to both ends of a DC voltage source;
an inverter circuit in which a plurality of legs each including a plurality of switches connected in series are connected in parallel, DC input terminals of the inverter circuit are connected to both ends of the capacitor series circuit, and AC output terminals of the inverter circuit are connected to a motor;
a switch circuit including a plurality of switches, one end of the switch circuit being connected to a connection point of the plurality of capacitors, other ends of the switch circuit being connected to a plurality of connection points of the switches of the inverter circuit; and
a control circuit to control the inverter circuit and the switch circuit, wherein
the inverter circuit is capable of two-level operation by turning off the plurality of switches included in the switch circuit and is capable of three-level operation by turning on/off the plurality of switches included in the switch circuit,
the control circuit switches between the two-level operation and the three-level operation based on a torque command and a rotational speed command for the motor, and
the control circuit holds a first operation table with which a sum of a loss of the motor and a loss of the power conversion device in accordance with the torque command and the rotational speed command can be calculated, and switches between the two-level operation and the three-level operation based on the first operation table.

2. The power conversion device according to claim 1, wherein the control circuit holds a second operation table with which the loss of the power conversion device and the loss of the motor in accordance with at least one of a voltage of the DC voltage source and a temperature of the power conversion device can be calculated, and switches between the two-level operation and the three-level operation based on the second operation table.

3. The power conversion device according to claim 2, wherein the control circuit switches the operation to the two-level operation when the torque command is equal to or greater than at least one threshold value set in advance and switches the operation to the three-level operation when the torque command is smaller than the at least one threshold value set in advance, in a case where the rotational speed command is the same.

4. The power conversion device according to claim 3, wherein the control circuit changes a carrier frequency of the inverter circuit when switching between the two-level operation and the three-level operation.

5. The power conversion device according to claim 3, wherein the control circuit has a plurality of the threshold values set therein, and one of the threshold values when the torque command increases is different from another of the threshold values when the torque command decreases.

6. The power conversion device according to claim 2, wherein the control circuit changes a carrier frequency of the inverter circuit when switching between the two-level operation and the three-level operation.

7. A motor system comprising:
the power conversion device according to claim 2; and
a motor connected to AC output terminals of the power conversion device, wherein
the control circuit of the power conversion device switches between the two-level operation and the three-level operation based on the torque command and the rotational speed command for the motor.

8. The power conversion device according to claim 1, wherein the control circuit switches the operation to the two-level operation when the torque command is equal to or greater than at least one threshold value set in advance and switches the operation to the three-level operation when the torque command is smaller than the at least one threshold value set in advance, in a case where the rotational speed command is the same.

9. The power conversion device according to claim 8, wherein the control circuit changes a carrier frequency of the inverter circuit when switching between the two-level operation and the three-level operation.

10. The power conversion device according to claim 8, wherein the control circuit has a plurality of the threshold values set therein, and one of the threshold values when the torque command increases is different from another of the threshold values when the torque command decreases.

11. The power conversion device according to claim 1, wherein the control circuit changes a carrier frequency of the inverter circuit when switching between the two-level operation and the three-level operation.

12. The power conversion device according to claim 11, wherein the control circuit sets a carrier frequency in the three-level operation to be equal to or lower than the carrier frequency in the two-level operation in a case where the rotational speed command is the same.

13. A motor system comprising:
the power conversion device according to claim 1; and
a motor connected to AC output terminals of the power conversion device,
wherein the control circuit of the power conversion device switches between the two-level operation and the three-level operation based on the torque command and the rotational speed command for the motor.

14. A power conversion device comprising:
a capacitor series circuit including a plurality of capacitors connected in series, both ends of the capacitor series circuit being connected to both ends of a DC voltage source;
an inverter circuit in which a plurality of legs each including a plurality of switches connected in series are connected in parallel, DC input terminals of the inverter circuit are connected to both ends of the capacitor series circuit, and AC output terminals of the inverter circuit are connected to a motor;
a switch circuit including a plurality of switches, one end of the switch circuit being connected to a connection point of the plurality of capacitors, other ends of the switch circuit being connected to a plurality of connection points of the switches of the inverter circuit; and
a control circuit to control the inverter circuit and the switch circuit, wherein
the inverter circuit is capable of two-level operation by turning off the plurality of switches included in the switch circuit and is capable of three-level operation by turning on/off the plurality of switches included in the switch circuit,
the control circuit switches between the two-level operation and the three-level operation based on a torque command and a rotational speed command for the motor, and
the control circuit switches the operation to the two-level operation when the torque command is equal to or greater than at least one threshold value set in advance and switches the operation to the three-level operation when the torque command is smaller than the at least one threshold value set in advance, in a case where the rotational speed command is the same.

15. The power conversion device according to claim 14, wherein the control circuit changes a carrier frequency of the inverter circuit when switching between the two-level operation and the three-level operation.

16. The power conversion device according to claim 14, wherein the control circuit has a plurality of the threshold values set therein, and one of the threshold values when the torque command increases is different from another of the threshold values when the torque command decreases.

17. A power conversion device comprising:
a capacitor series circuit including a plurality of capacitors connected in series, both ends of the capacitor series circuit being connected to both ends of a DC voltage source;
an inverter circuit in which a plurality of legs each including a plurality of switches connected in series are connected in parallel, DC input terminals of the inverter circuit are connected to both ends of the capacitor series circuit, and AC output terminals of the inverter circuit are connected to a motor;
a switch circuit including a plurality of switches, one end of the switch circuit being connected to a connection point of the plurality of capacitors, other ends of the switch circuit being connected to a plurality of connection points of the switches of the inverter circuit; and
a control circuit to control the inverter circuit and the switch circuit, wherein
the inverter circuit is capable of two-level operation by turning off the plurality of switches included in the switch circuit and is capable of three-level operation by turning on/off the plurality of switches included in the switch circuit,
the control circuit switches between the two-level operation and the three-level operation based on a torque command and a rotational speed command for the motor, and
the control circuit changes a carrier frequency of the inverter circuit when switching between the two-level operation and the three-level operation.

18. The power conversion device according to claim 17, wherein the control circuit sets a carrier frequency in the three-level operation to be equal to or lower than the carrier frequency in the two-level operation in a case where the rotational speed command is the same.

\* \* \* \* \*